United States Patent
Maier

(10) Patent No.: US 12,492,791 B2
(45) Date of Patent: *Dec. 9, 2025

(54) ILLUMINATION DEVICE FOR A MOTOR VEHICLE

(71) Applicant: ZKW Group GmbH, Wieselburg (AT)

(72) Inventor: Christian Maier, Berggasse (AT)

(73) Assignee: ZKW Group GmbH, Wieselburg (AT)

( * ) Notice: Subject to any disclaimer, the term of this patent is extended or adjusted under 35 U.S.C. 154(b) by 83 days.

This patent is subject to a terminal disclaimer.

(21) Appl. No.: 18/701,330

(22) PCT Filed: Sep. 20, 2022

(86) PCT No.: PCT/EP2022/076003
§ 371 (c)(1),
(2) Date: Apr. 15, 2024

(87) PCT Pub. No.: WO2023/066580
PCT Pub. Date: Apr. 27, 2023

(65) Prior Publication Data
US 2024/0344679 A1     Oct. 17, 2024

(30) Foreign Application Priority Data
Oct. 19, 2021   (EP) .................................... 21203360

(51) Int. Cl.
*F21S 41/24*     (2018.01)
*F21S 41/20*     (2018.01)
(Continued)

(52) U.S. Cl.
CPC ............. *F21S 41/24* (2018.01); *F21S 41/285* (2018.01); *F21S 43/237* (2018.01);
(Continued)

(58) Field of Classification Search
CPC ............................ F21S 41/285; F21S 43/237
See application file for complete search history.

(56) References Cited

U.S. PATENT DOCUMENTS

| | | | |
|---|---|---|---|
| 12,311,833 B1* | 5/2025 | Johnson | F21S 41/25 |
| 2016/0131320 A1* | 5/2016 | Heinemann | F21S 41/29 |
| | | | 362/555 |

(Continued)

FOREIGN PATENT DOCUMENTS

| | | |
|---|---|---|
| CN | 208504255 U | 2/2019 |
| CN | 209977826 U | 1/2020 |

(Continued)

OTHER PUBLICATIONS

Extended European Search Report for European Patent Application No. 21203360.9 dated Mar. 21, 2022 (7 Pages).

(Continued)

*Primary Examiner* — Eric T Eide
(74) *Attorney, Agent, or Firm* — Eversheds Sutherland (US) LLP

(57) ABSTRACT

Illumination device (1) for a motor vehicle headlight, comprising an illuminant (2) and a light guide (3), wherein the light from the illuminant (2) enters the light guide (3) and exits via an exit section (3a), a first optical element (4) with a light entry surface and a light exit surface associated with the light entry surface, wherein light from the light guide (3) can enter the first optical element (4) via the light entry surface and exit via the light exit surface, wherein the light entry surface has a first section (4a) and at least one second section (4b) adjoining the first section, wherein the illumination device (1) has a second optical element (5) between the exit section (3a) and the light entry surface (4a, 4b), which is configured to deflect the light that exits the light guide (3) in such a way that the light, after passing through the second optical element (5), strikes the entire first section (4a) and the entire second section (4b) of the light entry surface of the first optical element (4).

16 Claims, 1 Drawing Sheet

Figure 1:
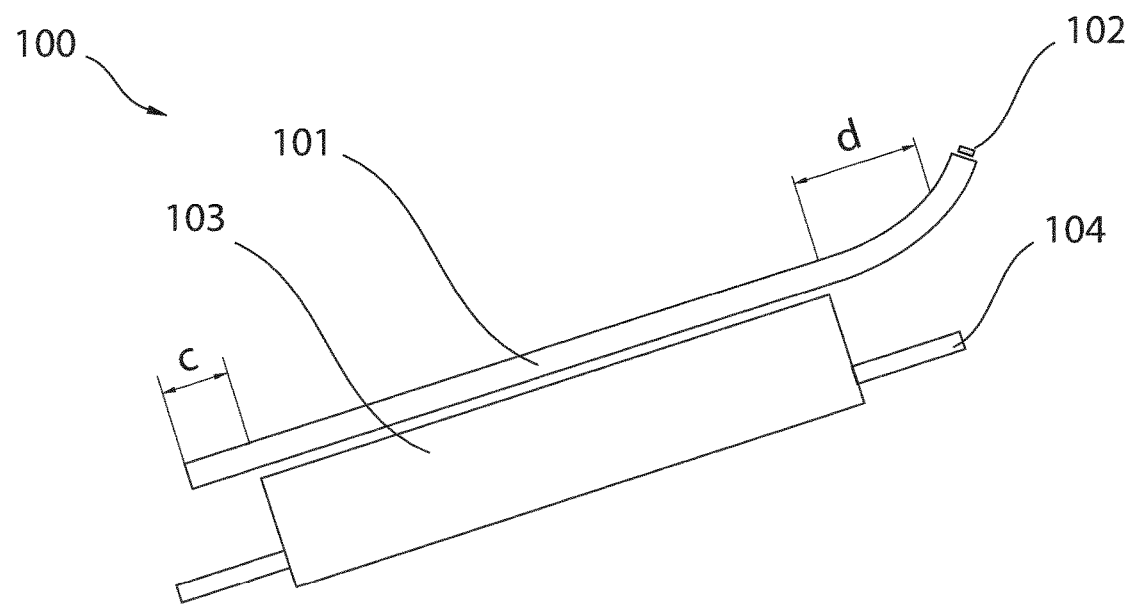

(51) Int. Cl.
    *F21S 43/20*         (2018.01)
    *F21S 43/237*       (2018.01)
    *F21S 43/245*       (2018.01)
    *F21W 103/55*      (2018.01)

(52) U.S. Cl.
    CPC ....... *F21S 43/245* (2018.01); *F21S 43/26411* (2024.05); *F21W 2103/55* (2018.01)

(56) References Cited

U.S. PATENT DOCUMENTS

| | | | |
|---|---|---|---|
| 2016/0252228 A1 | 9/2016 | Martinez et al. | |
| 2018/0313505 A1* | 11/2018 | Gao | F21S 43/40 |
| 2019/0271447 A1* | 9/2019 | Choo | F21S 41/24 |
| 2019/0285791 A1* | 9/2019 | Gloss | G02B 6/0016 |

FOREIGN PATENT DOCUMENTS

| | | |
|---|---|---|
| DE | 102015204747 A1 | 9/2016 |
| EP | 2587120 A1 | 5/2013 |
| JP | 2012230862 A | 11/2012 |
| WO | 2016154647 A1 | 10/2016 |

OTHER PUBLICATIONS

Search Report for International Patent Application No. PCT/EP2022/076003 dated Nov. 7, 2022 (14 Pages).

\* cited by examiner

ILLUMINATION DEVICE FOR A MOTOR VEHICLE

The invention relates to an illumination device for a motor vehicle headlight, wherein the illumination device comprises:
an illuminant for producing and emitting light,
a light guide, wherein the light from the illuminant enters the light guide via an entry surface of the light guide, wherein the light guide has a deflection surface, for deflecting the light that enters the light guide, and a front surface opposite the deflection surface, wherein an area of the front surface forms an exit section, via which the light that enters the light guide and is deflected via the deflection surface exits the light guide, wherein the light exits along a main emission direction, wherein the light guide has an end section adjoining the exit section on a side facing away from the illuminant,
a first optical element with a light entry surface and a light exit surface associated with the light entry surface, wherein light from the light guide can enter the first optical element via the light entry surface and exit via the light exit surface, wherein the light entry surface has a first section and at least one second section adjoining the first section, wherein the first optical element is arranged with respect to the light guide in such a way that the light that exits the exit section of the light guide only strikes the entire first section.

The invention further relates to a motor vehicle headlight, comprising at least one light module for producing a first light function, and at least one illumination device for producing a second light function.

Generic illumination devices are known in the prior art. Light guides and thick-wall optics are often used as a first optical element in the prior art, which are used, for example, as signal lights, such as direction indicators and daytime running lights. In order to ideally illuminate an edge region or a second section of the light entry surface of the first optical element, the light guide feeding light to the optical element should be longer than the light entry surface of the first optical element. However, this is not always possible due to space constraints. In order to enable complete illumination of the light entry surface, several light sources are usually used in the prior art, which each illuminate a certain region of the light entry surface. This can guarantee uniform illumination of the entire light entry surface.

Disadvantageously, the use of several light sources increases the manufacturing costs and energy consumption of the illumination device and reduces the homogeneity of the luminous phenomenon.

The object of the invention is therefore to produce an illumination device which mitigates the drawbacks of the prior art. The object of the invention is therefore in particular to produce an illumination device which simplifies the illumination of the light entry surface.

This object is achieved by an illumination device having the features of Claim 1 and a motor vehicle headlight having the features of Claim 15. Preferred embodiments are specified in the dependent claims.

According to the invention, the illumination device has a second optical element, which is arranged between the exit section of the light guide and the light entry surface of the first optical element and is configured to deflect the light that exits the exit section of the light guide in such a way that the light, after passing through the second optical element, strikes the entire first section and the entire second section of the light entry surface of the first optical element.

This has the advantage that the first and second section of the light entry surface are illuminated uniformly without the need for additional light sources that illuminate the second section separately. The light guide can be rod-shaped and have a longitudinal extension. The light guide can have an oval or round cross-section. The light guide can have an outer surface, which extends away from the entry surface of the light guide, wherein a section of the outer surface can be formed as a deflection surface section or deflection surface. This deflection surface section or this deflection surface can have deflection elements, which deflect the light that propagates in the light guide in the direction of the front surface, wherein the deflection elements can, for example have prismatic structures and use total internal reflection for light deflection. The first optical element can be configured to produce a light function, in particular a signal light function. Light that exits via the exit section of the light guide can in particular be emitted with a substantially constant illuminance across the exit surface. The exit section can be smaller than the overall length of the light guide. In particular, the exit section can be curved or the light guide can follow a curved trajectory. The length of the exit section can be shorter than the overall light entry surface of the first optical element. Light preferably only exits via the exit section of the light guide. The second optical element can be arranged between the first, preferably between the first and the second, section of the light entry surface of the first optical element.

It can be provided that the exit section of the light guide and an envelope of the first section of the light entry surface of the first optical element are oriented substantially parallel to one another. This has the advantage that the light enters the first optical element particularly homogeneously.

It can be provided that the end section of the light guide is arranged on a holding element, wherein the holding element is configured to fix the position of the light guide relative to the second optical element, wherein the holding element preferably has a holding section, in which the end section of the light guide is accommodated, wherein the holding section is configured as an opaque shell surrounding the end section. This enables the light guide to be attached particularly easily and reliably. The end section can preferably comprise less than 10% of the overall length of the light guide. The front surface of the end section is preferably not configured as an exit section in order to avoid so-called "hot spot" light impressions. The holding element can be concealed by the first optical element.

It can be provided that a light entry surface and a light exit surface of the second optical element are configured to fan out light rays substantially radially about the main emission direction as they pass through the second optical element. Fanning out can be understood as a propagation of the light rays. In particular, light rays can diverge after passing through the second optical element.

It can be provided that light rays are oriented substantially parallel to the main emission direction before and after passing through the second optical element.

It can be provided that the second optical element has entrance optics on a surface facing the exit section of the light guide, which are configured to deflect the light that exits the exit section of the light guide at least partly in the direction of the second section of the first optical element as it enters the second optical element. The entrance optics can be configured, for example, as entrance prisms.

It can be provided that the second optical element has exit optics on a surface facing the first optical element, which are configured to deflect the light as it exits the second optical element in such a way that the light strikes the second section of the first optical element. The exit optics can in particular be configured as deflection prisms.

It can be provided that the light rays emerging from the second optical element are oriented substantially parallel to the light rays exiting the exit section of the light guide. In particular, the light rays can have the same direction or orientation before and after passing through the second optical element. In this context, parallelism can be understood as the parallelism of light rays in at least one or two directions.

It can be provided that the light guide and the second optical element are spaced apart from one another and/or the first optical element and the second optical element are spaced apart from one another. It can be provided that there is a gap of 0.1 mm to 5 mm, in particular of 0.5 mm to 1.5 mm between the light guide and the second optical element and/or between the first optical element and the second optical element. It can also be provided that the second optical element is arranged relative to the light guide and the first optical element in such a way that a surface of the second optical element facing the light guide has an equidistant distance from the exit section of the light guide, and/or that a surface of the second optical element facing the first optical element has an equidistant distance from the light entry surface of the first optical element.

It can be provided that the light guide is curved at least in sections, wherein a surface of the second optical element facing the light guide has a curve, which is substantially the same as the curve of the curved section of the light guide. As a result, the light guide and the second optical element can be arranged in a particularly space-saving manner, for example within a motor vehicle headlight.

It can be provided that a surface of the second optical element facing the first optical element is oriented substantially parallel to the light entry surface of the first optical element.

It can be provided that the first and/or second optical element is configured as a transparent solid body. In this context, transparent can be understood as transparent for the light that can be generated with the illuminant.

It can be provided that light only exits the light guide via the exit section. The entire exit section of the light guide can be arranged directly opposite the entire light entry area of the second optical element.

It can be provided that the light guide has an initial section, which is arranged on a side of the light guide facing the illuminant and upstream of the exit section in a light propagation direction, wherein the front surface of the initial section is not configured as an exit section. It can be provided that the initial section has a front surface and a rear surface opposite the front surface, wherein the rear surface is not configured as a deflection surface. Light preferably cannot exit via the initial section. The initial section can be configured as a homogenization section, in which the light from the illuminant is mixed or homogenized before exiting the light guide. There is in particular no exit section in the initial section. Deflection in the direction of the front surface of the light guide, onto the exit section, cannot in particular take place in the initial section. The light emitted by means of the illuminant, which enters the light guide via the entry surface of the light guide, can be transmitted via total internal reflection in the initial section until it can reach the area of the exit section and strike the deflection surface there. Thanks to the upstream initial section, which is preferably at least two times, in particular three to four times, as long as the diameter D of the light guide, the light can be homogenized in terms of angular distribution by multiple instances of total internal reflection on a light guide wall or an outer surface of the light guide. Due to the lack of space in the illumination device, the first optical element can be arranged relative to the light guide in such a way that the first optical element optically or visually conceals the initial section of the light guide as well as the illuminant (which can have a circuit board incl. power supply and a heat sink). In particular, there are no output elements or deflection surfaces in the initial section of the light guide for complete illumination of the light entry surface of the first optical element.

According to the invention, a motor vehicle headlight is provided, comprising at least one light module for producing a first light function, and at least one illumination device for producing a second light function, wherein the first light function is a dipped beam or a full beam and the second light function is a signal light or a daytime running light.

It can be provided that a motor vehicle headlight comprises at least one illumination device according to the invention.

Figure 2:
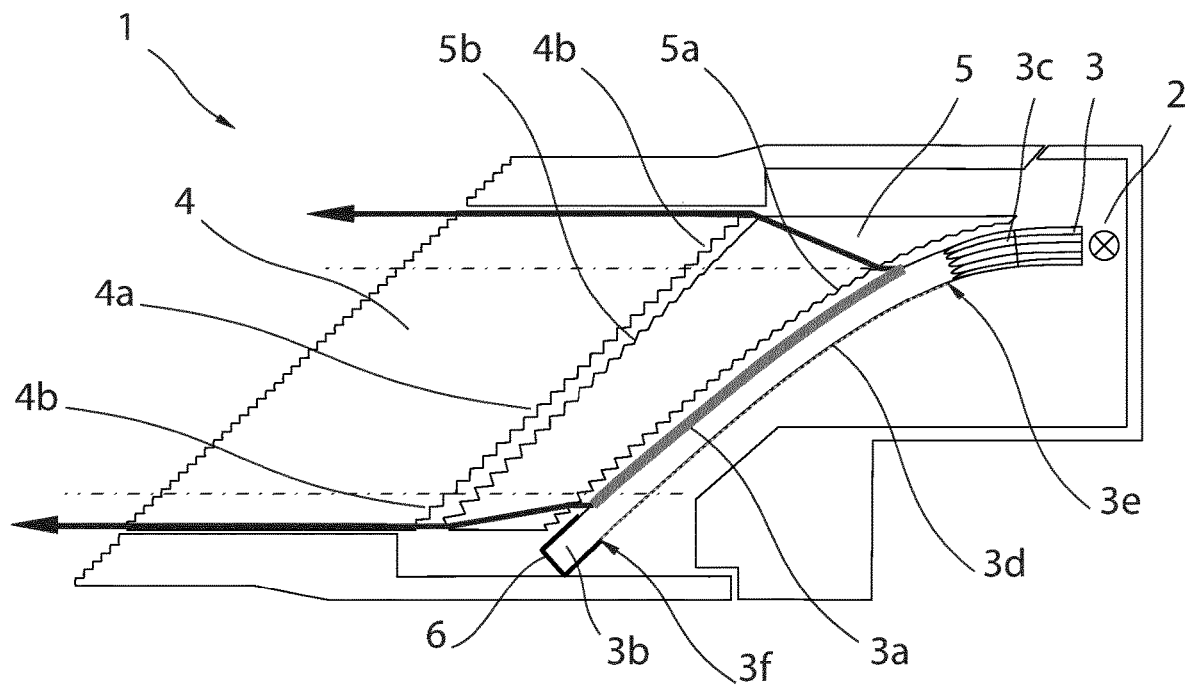

The invention is outlined in more detail below based on a preferred exemplary embodiment, to which it is, however, not limited: In the drawings:

FIG. 1 shows a schematic view of an illumination device according to the prior art; and FIG. 2 shows a schematic side view of an illumination device according to the invention.

The illumination device 100 according to the prior art shown in FIG. 1 has a light guide 101, which injects light from a light source 102 into an optical element 103. In order to be able to inject light into the edge regions of the optical element 103, the light guide 101 is longer than the optical element 103. A screen 104 is arranged on a left and right edge of the optical element 103. The light guide 101 is longer than the optical element 103 at least by sections d and c in order to achieve complete light entry into the optical element 103.

FIG. 2 shows an exemplary embodiment of an illumination device 1 according to the invention for a motor vehicle headlight. The illumination device 1 comprises an illuminant 2 for producing and emitting light and a light guide 3. The light from the illuminant 2 enters the light guide 3 via an entry surface of the light guide 3. The light guide 3 has a deflection surface, for deflecting the light that enters the light guide 3, and a front surface opposite the deflection surface, wherein one area of the front surface forms an exit section 3a. The light that enters the light guide 3 and is deflected via the deflection surface exits the light guide 3 via the exit section 3a. The light exits along a main emission direction.

The light guide 3 has an end section 3b adjoining the exit section 3a on a side facing away from the illuminant.

Furthermore, the light guide has an initial section 3c, which is arranged on a side of the light guide 3 facing the illuminant and upstream of the exit section 3a in a light propagation direction. The front surface of the initial section 3c is in particular not configured as an exit section 3a. Light preferably only exits the light guide via the exit section 3a.

On a side facing away from the second optical element 5, the light guide 3 preferably has deflection prisms 3d for guiding light in the light guide 3. The deflection prisms 3d are arranged substantially from a prism initial section 3e of the light guide 3, wherein the prism initial section 3e is arranged downstream of the initial section 3c of the light guide 3 in a light propagation direction. The deflection prisms 3d are arranged up to a prism end section 3f in the light guide 3. The prism end section 3f is in particular directly adjacent to the end section 3b of the light guide. The deflection prisms 3d can substantially form the deflection surface of the light guide 3.

The illumination device 1 further comprises a first optical element 4 with a light entry surface and a light exit surface associated with the light entry surface. Light from the light guide 3 can enter the first optical element 4 via the light entry surface and exit via the light exit surface. The light entry surface has a first section 4a and at least one second section 4b adjoining the first section 4a. In the exemplary embodiment shown, the light entry surface has two second sections 4b, wherein the first section 4a is arranged between the two second sections 4b. The first optical element 4 is arranged with respect to the light guide 3 in such a way that the light that exits the exit section 3a of the light guide 3 only strikes the entire first section 4a.

The illumination device 1 further comprises a second optical element 5, which is arranged between the exit section 3a of the light guide 3 and the light entry surface of the first optical element 4 and is configured to deflect the light that exits the exit section of the light guide 3 in such a way that the light, after passing through the second optical element 5, strikes the entire first section 4a and the entire second section 4b of the light entry surface of the first optical element 4. A light entry surface and a light exit surface of the second optical element 5 are preferably configured to fan out light rays substantially radially about the main emission direction as they pass through the second optical element 5. Light rays can be oriented substantially parallel to the main emission direction before and after passing through the second optical element 5.

The second optical element 5 has entrance optics on a surface 5a facing the exit section 3a of the light guide 3, which are configured to deflect the light that exits the exit section 3a of the light guide 3 at least partly in the direction of the second section 4b of the first optical element 4 as it enters the second optical element 5.

The second optical element 5 has exit optics on a surface 5b facing the first optical element 4, which are configured to deflect the light as it exits the second optical element 5 in such a way that the light strikes the second section 4b of the first optical element 4.

The light rays emerging from the second optical element 5 can be oriented substantially parallel to the light rays exiting the exit section 3a of the light guide 3.

An envelope of the first section 4a of the light entry surface of the first optical element 4 is oriented substantially parallel to the exit section 3a of the light guide 3.

The end section 3b of the light guide is arranged on a holding element 6. The holding element 6 is configured to fix the position of the light guide 3 relative to the second optical element 5. The holding element 6 has a holding section, in which the end section 3b of the light guide 3 is accommodated. The holding section is, for example, configured as an opaque shell surrounding the end section 3b.

In the exemplary embodiment shown, the light guide 3 and the second optical element 5 are spaced apart from one another and the first optical element 4 and the second optical element 5 are spaced apart from one another. The light guide is curved at least in sections, wherein a surface 5a of the second optical element 5 facing the light guide 3 has a curve, which is substantially the same as the curve of the curved section of the light guide 3.

The first 4 and second optical element 5 are configured as a transparent solid body.

The illumination device 1 can be part of a motor vehicle headlight. The motor vehicle headlight can have at least one light module for producing a first light function, and at least one illumination device 1 according to the invention for producing a second light function. The first light function can be a dipped beam or a full beam and the second light function can be a signal light or a daytime running light.

The invention claimed is:

1. An illumination device (1) for a motor vehicle headlight, wherein the illumination device comprises:
    an illuminant (2) for producing and emitting light;
    a light guide (3), wherein the light from the illuminant (2) enters the light guide (3) via an entry surface of the light guide (3), wherein the light guide (3) has a deflection surface, for deflecting the light that enters the light guide (3), and a front surface opposite the deflection surface, wherein an area of the front surface forms an exit section (3a), via which the light that enters the light guide (3) and is deflected via the deflection surface exits the light guide (3), wherein the light exits along a main emission direction, wherein the light guide (3) has an end section (3b) adjoining the exit section (3a) on a side facing away from the illuminant; and
    a first optical element (4) with a light entry surface and a light exit surface associated with the light entry surface, wherein light from the light guide (3) can enter the first optical element (4) via the light entry surface and exit via the light exit surface, wherein the light entry surface has a first section (4a) and at least one second section (4b) adjoining the first section, wherein the first optical element (4) is arranged with respect to the light guide (3) in such a way that the light that exits the exit section (3a) of the light guide (3) only strikes the entire first section (4a),
    wherein the illumination device (1) has a second optical element (5), which is arranged between the exit section (3a) of the light guide (3) and the light entry surface of the first optical element (4) and is configured to deflect the light that exits the exit section of the light guide (3) in such a way that the light, after passing through the second optical element (5), strikes the entire first section (4a) and the entire second section (4b) of the light entry surface of the first optical element (4).

2. The illumination device (1) according to claim 1, wherein the exit section (3a) of the light guide (3) and an envelope of the first section (4a) of the light entry surface of the first optical element (4) are oriented substantially parallel to one another.

3. The illumination device (1) according to claim 1, wherein the end section (3b) of the light guide is arranged on a holding element (6), wherein the holding element (6) is configured to fix the position of the light guide (3) relative to the second optical element (5).

4. The illumination device (1) according to claim 1, wherein a light entry surface and a light exit surface of the second optical element (5) are configured to fan out light rays substantially radially about the main emission direction as they pass through the second optical element (5).

5. The illumination device (1) according to claim 1, wherein light rays are oriented substantially parallel to the main emission direction before and after passing through the second optical element (5).

6. The illumination device (1) according to claim 1, wherein the second optical element (5) has entrance optics on a surface (5a) facing the exit section (3a) of the light guide (3), which are configured to deflect the light that exits the exit section (3a) of the light guide (3) at least partly in the direction of the second section (4b) of the first optical element (4) as it enters the second optical element (5).

7. The illumination device (1) according to claim 1, wherein the second optical element (5) has exit optics on a surface (5b) facing the first optical element (4), which are configured to deflect the light as it exits the second optical element (5) in such a way that the light strikes the second section (4b) of the first optical element (4).

8. The illumination device (1) according to claim 1, wherein the light rays emerging from the second optical element (5) are oriented substantially parallel to the light rays exiting the exit section (3a) of the light guide (3).

9. The illumination device (1) according to claim 1, wherein the light guide (3) and the second optical element (5) are spaced apart from one another and/or the first optical element (4) and the second optical element (5) are spaced apart from one another.

10. The illumination device (1) according to claim 1, wherein the light guide is curved at least in sections, wherein a surface (5a) of the second optical element (5) facing the light guide (3) has a curve, which is substantially the same as the curve of the curved section of the light guide (3).

11. The illumination device (1) according to claim 1, wherein a surface (5b) of the second optical element (5) facing the first optical element (4) is oriented substantially parallel to the light entry surface (4a, 4b) of the first optical element (4).

12. The illumination device (1) according to claim 1, wherein the first and/or second optical element (5) is configured as a transparent solid body.

13. The illumination device (1) according to claim 1, wherein light only exits the light guide via the exit section (3a).

14. The illumination device (1) according to claim 1, wherein the light guide (3) has an initial section (3c), which is arranged on a side of the light guide (3) facing the illuminant and upstream of the exit section (3a) in a light propagation direction, wherein the front surface of the initial section (3c) is free from the exit section (3a).

15. A motor vehicle headlight, comprising:
at least one light module for producing a first light function; and
at least one illumination device (1) according to claim 1 configured to produce a second light function,
wherein the first light function is a dipped beam or a full beam and the second light function is a signal light or a daytime running light.

16. The illumination device (1) according to claim 3, wherein the holding element 6) has a holding section, in which the end section (3b) of the light guide (3) is accommodated, wherein the holding section is configured as an opaque shell surrounding the end section (3b).

* * * * *